United States Patent
Edwards

(10) Patent No.: US 7,312,766 B1
(45) Date of Patent: Dec. 25, 2007

(54) METHOD AND SYSTEM FOR TIME/MOTION COMPENSATION FOR HEAD MOUNTED DISPLAYS

(75) Inventor: Eric C. Edwards, Westmount (CA)

(73) Assignee: Canadian Space Agency, Saint-Hubert, QC (CA)

( * ) Notice: Subject to any disclaimer, the term of this patent is extended or adjusted under 35 U.S.C. 154(b) by 725 days.

(21) Appl. No.: 10/088,747

(22) PCT Filed: Sep. 22, 2000

(86) PCT No.: PCT/CA00/01063

§ 371 (c)(1),
(2), (4) Date: Mar. 22, 2002

(87) PCT Pub. No.: WO01/22149

PCT Pub. Date: Mar. 29, 2001

(51) Int. Cl.
*G09G 5/00* (2006.01)
*G02B 27/14* (2006.01)
*H04N 7/00* (2006.01)
*H04N 7/18* (2006.01)
*H04N 9/47* (2006.01)

(52) U.S. Cl. ............................ 345/8; 359/630; 248/115

(58) Field of Classification Search ................ 345/1.1, 345/1.3, 7–9, 156, 158, 162, 184, 427, 474, 345/592, 595, 620, 649; 340/901–905, 980; 359/13, 630–633; 348/42, 47, 94, 50–53, 348/115, 117, 123, 129, 130, 135, 139, 142–144, 348/148, 161, 169, 207.11, 208.2, 208.4, 348/208.14, 211.7, 211.8, 211.9, 211.11, 348/211.14, 376
See application file for complete search history.

(56) References Cited

U.S. PATENT DOCUMENTS

| | | | | |
|---|---|---|---|---|
| 4,028,725 A | * | 6/1977 | Lewis | .................... 348/115 |
| 4,568,159 A | * | 2/1986 | Baldwin | .................... 351/210 |
| 5,307,271 A | * | 4/1994 | Everett et al. | .................... 701/24 |
| 5,579,026 A | | 11/1996 | Tabata | |
| 5,684,498 A | * | 11/1997 | Welch et al. | .................... 345/8 |
| 5,917,460 A | | 6/1999 | Kodama | |
| 5,933,125 A | * | 8/1999 | Fernie et al. | .................... 345/8 |
| 5,978,015 A | * | 11/1999 | Ishibashi et al. | .................... 348/47 |
| 5,980,256 A | * | 11/1999 | Carmein | .................... 434/55 |
| 5,984,475 A | * | 11/1999 | Galiana et al. | .................... 351/209 |
| 6,152,854 A | * | 11/2000 | Carmein | .................... 482/4 |

(Continued)

OTHER PUBLICATIONS

Hirose et al, "Transmission of Realistic Sensation: Development of Virtual Dome," Proc. IEEE VRAIS 93, IEEE Neural Networks Council, Piscataway, N.J., Jan. 1993, pp. 125-131.*

*Primary Examiner*—Jeff Piziali
(74) *Attorney, Agent, or Firm*—Marks & Clerk

(57) ABSTRACT

A method and system for time-motion compensation for use with head mounted displays is disclosed. According to the method, a remote camera captures an image for display on a head-mounted display (HMD) including a viewing window. The image and camera position data is transmitted to a system including the HMD for display to a wearer of the HMD. The HMD position is determined. An offset between the HMD position and a known position of the HMD is determined as is an offset between the camera position and a known position of the camera. The image is offset relative to the viewing window of the image based on the difference between the two determined offsets.

20 Claims, 12 Drawing Sheets

U.S. PATENT DOCUMENTS 6,307,589 B1 * 10/2001 Maquire, Jr. ............ 348/333.03
6,317,127 B1 * 11/2001 Daily et al. ................. 345/629
6,327,381 B1 * 12/2001 Rogina et al. .............. 382/154
6,580,448 B1 * 6/2003 Stuttler ........................ 348/46

* cited by examiner

NOMINAL DISPLAY OF IMAGE

VERTICAL OFFSET OF IMAGE

HORIZONTAL
OFFSET
OF IMAGE

ROTATION
OF IMAGE

VERTICAL AND
HORIZONTAL
OFFSETS
IN ADDITION TO
ROTATION
OF IMAGE

INITIAL VIEW

DISPLAYED IMAGE
AS HEAD TURNED
TO THE LEFT

DISPLAYED IMAGE
WITH CAMERA
CATCHING UP

DISPLAYED IMAGE
WITH CAMERA
CAUGHT UP

METHOD AND SYSTEM FOR TIME/MOTION COMPENSATION FOR HEAD MOUNTED DISPLAYS

FIELD OF THE INVENTION

The present invention generally relates to telepresence systems and more particularly relates to motion compensation in telepresence systems.

BACKGROUND OF THE INVENTION

The field of remote control has come a long way since the days of watching a model aircraft fly under the control of a handheld controller. Robotics and remote robotic manipulation have created a strong and pressing need for more remote and better remote control systems. Obviously, an ideal form of remote control involves providing an operator with all the sensations of operating the remote robot without the inherent dangers, travel, and so forth. In order to achieve this, a telepresence system is used.

Telepresence systems are sensory feedback systems for allowing sensing and monitoring of remote systems. A typical telepresence sensor is a camera and a head mounted display. The system provides visual feedback from a remote location to an operator. For example, in a telepresence system for an automobile, the front windshield is provided with a camera. The controls of the vehicle are provided with actuators for automatically manipulating same. An operator is provided with a duplicate of the cabin of the car. The windshield is replaced with a display and the controls are linked via communications to the actuators within the vehicle. Turning of the steering wheel in the cabin of the car causes the steering wheel to turn in the vehicle. Similarly, the camera captures images in front of the car and they are displayed on the display in the cabin of the car.

Presently, there is a trend toward providing the visual feedback using a head mounted display (HMD). A head mounted display is a small display or two small displays mounted for being worn on a users head. Advantageously, an HMD with two displays provides stereo imaging allowing a user to perceive depth of field. Alternatively, such an HMD provides two identical images, one to each display. Unfortunately, the head mounted display only presents a user with information from approximately in front of the user. Thus, when a user turns their head, the image seen and the expected image differ. Therefore, the camera is mounted on a mechanism which moves in accordance with detected HMD movement. Thus, the image before the user is in accordance with the user's head position.

Generally, it is an object of telepresence systems to provide a visual sensation of being in the place of the robot and a control system for controlling the robot as well. Thus, telepresence systems aim to provide feedback that is appropriate to different situations.

Unfortunately, a camera does not move in exact synchronisation with the HMD so the image is not perfectly aligned with the expectations of the user during head motion. This misalignment can result in disorientation and nausea on the part of an operator.

The disclosures in U.S. Pat. No. 5,579,026 issued on Nov. 26, 1996 in the name of Tabata and in U.S. Pat. No. 5,917,460 issued on Jun. 29, 1999 in the name of Kodama focus on image display for use in, for example, virtual reality and games. In there is described a head mounted display in which the position of the projected image can be displaced in response to a control unit or in response to the rotational motion of the operator's head. The essence of the head-tracking implementation is that from the user's perspective, the image can be made to remain substantially stationary in space during head movements, by being manipulated in a manner opposite to the movements. Significantly, the patents do not relate to visual telepresence using slaved cameras. In the slaved camera implementation, the camera should follow the motion of the HMD and, as such, compensation for HMD motion is unnecessary since the image is always of a direction in which the head is directed.

Further because U.S. Pat. No. 5,579,026 relates to displaying a simulated planar image, such as a simulation of a television screen located in virtual space in front of the user, the patent provides for a fixed frame of reference relative to a wearer of the HMD. The images in any direction are simulated thus being formed as needed. Unfortunately, in telepresence systems, often the video data relating to a particular direction of view is unavailable. This complicates the system significantly and as such, the prior art relating to video data display is not truly applicable and, one of skill in the art would not refer to such.

In U.S. Pat. No. 5,917,460 issued on Jun. 29, 1999 in the name of Kodama a system addressing the three-axes displacement (up/down, left/right, frontwards/backwards) of a HMD is provided. The displacement appears to linear and is accommodated through a mechanical mechanism. The displays are moved in response to detected movement of a head and as such, objects remain somewhat stationary from the visual perspective of the user.

It is not well suited to use in telepresence wherein a camera tracks the motion of the HMD. One of skill in the art, absent hindsight, would not be drawn to maintaining a visual reference when a head is turned, for a telepresence system wherein a camera is rotated in response to head movement. Of course, the different problem results in a different solution.

For example, in telepresence systems, the delay between camera image capture and head motion is often indeterminate. It is not a workable solution to implement the system of the above referenced patents to solve this problem. Because of the unknown delays caused by camera response time and communication delays, the solution is not trivial.

In U.S. Pat. No. 5,933,125 a system is disclosed using prediction of the head movement to pre-compensate for the delay expected in the generation of a virtual image, nominally in a simulated environment. By this means, a time lag in the generation of imagery is compensated for by shifting the scene to provide a stable visual frame of reference. This method is applicable to short delays and small displacements, where head tracking information can be used to predict the next head position with reasonable accuracy. The patent discloses 100 msec as a normal value. Effective prediction of head motion is aided by comprehensive information about head movement, including angular head velocity and angular acceleration. For small head movements, errors induced are small. Typically, these occur in a small period of time. The disclosed embodiments rely on knowledge of the time delay, which is nominally considered to be constant. Unfortunately, when the time delays grow large allowing for substantial motion of a head, the errors in the predictive algorithm are unknown and the system is somewhat unworkable.

Furthermore, U.S. Pat. No. 5,933,125 cannot compensate for unanticipated image movement, only that which occurs in correct response to the operator's head movement. Also, it does not relate to visual telepresence systems using remote slave cameras.

It would be highly advantageous to provide a system that does not rely on any form of prediction for compensation and which works with variable delays between image capture and image display.

OBJECT OF THE INVENTION

In order to overcome these and other shortcomings of the prior art, it is an object of the invention to provide a method of compensating for time delays between head motion and camera motion in telepresence systems.

SUMMARY OF THE INVENTION

The invention relates to a method and apparatus that provides a wearer of an HMD with a stable frame of visual reference in cases where there may be time delays or unwanted motion within the visual capture/visual display systems.

According to the invention, in order to eliminate some of the disorientation caused by time delays in camera motion when a head motion occurs, an image shown on the display of a head-mounted display (HMD) is offset relative to the field of view of the HMD until the camera position is again synchronised with the HMD position. Offsetting of the image results in areas of the display for which no image information is available. These display areas are provided fill data in the form of a solid shading or some feature set for providing visual cues. When the transformed images again overlap the display, the fill is no longer necessary.

In accordance with the invention there is provided a method of motion compensation for head mounted displays. The method includes the following steps: providing an image from an image capture device to a head mounted display including a monitor having a field of view; providing camera position data associated with the image; providing head position data; adjusting the image location relative to the field of view of the monitor in accordance with the camera position data and the head position data; and, displaying portions of the image at the adjusted locations, those portions remaining within the field of view.

Typically position data includes at least one of orientation data and location data. Location data is also referred to as displacement data. Typically, portions of the field of view without image data are filled with a predetermined fill. When none of the image data is for display within the field of view, the entire field of view is filled with the predetermined fill.

For example, the image is adjusted by the following steps: determining an offset between the head mounted display position and the camera position; and, offsetting the image such that it is offset an amount equal to the offset between the head mounted display position and the camera position.

Advantageously, such a system is not limited by the accuracy of a predictive process nor by the time delay between image capture and image display. Instead, it is reactive, and uses sensed information on HMD position and camera position to formulate a transformation for the captured image. The present invention has no limit to the time delays for which compensation is possible since the required head position information and camera position information are sensed at different times allowing compensation for any delay between sensing one and then sensing the other.

Further advantageously, the present invention requires no knowledge of the time delay in the system and functions properly in the presence of non-constant time delays. There is no requirement that the time delay be measured and it is not used in determining the transform of the image.

BRIEF DESCRIPTION OF THE DRAWINGS

The invention will now be described in conjunction with the drawings in which.

DETAILED DESCRIPTION OF THE INVENTION

The present invention is described with reference to telepresence systems operating over long distances such that significant time delays occur between head motion and image display of an image for a current head orientation. It is, however, equally applicable when a camera drive mechanism provides insufficient response rate to allow comfortable viewing of images during normal head motion. It is also applicable in situations where unwanted and unmodeled motion of the camera is possible, such as when the camera is mounted on a moving platform.

Figure 1:
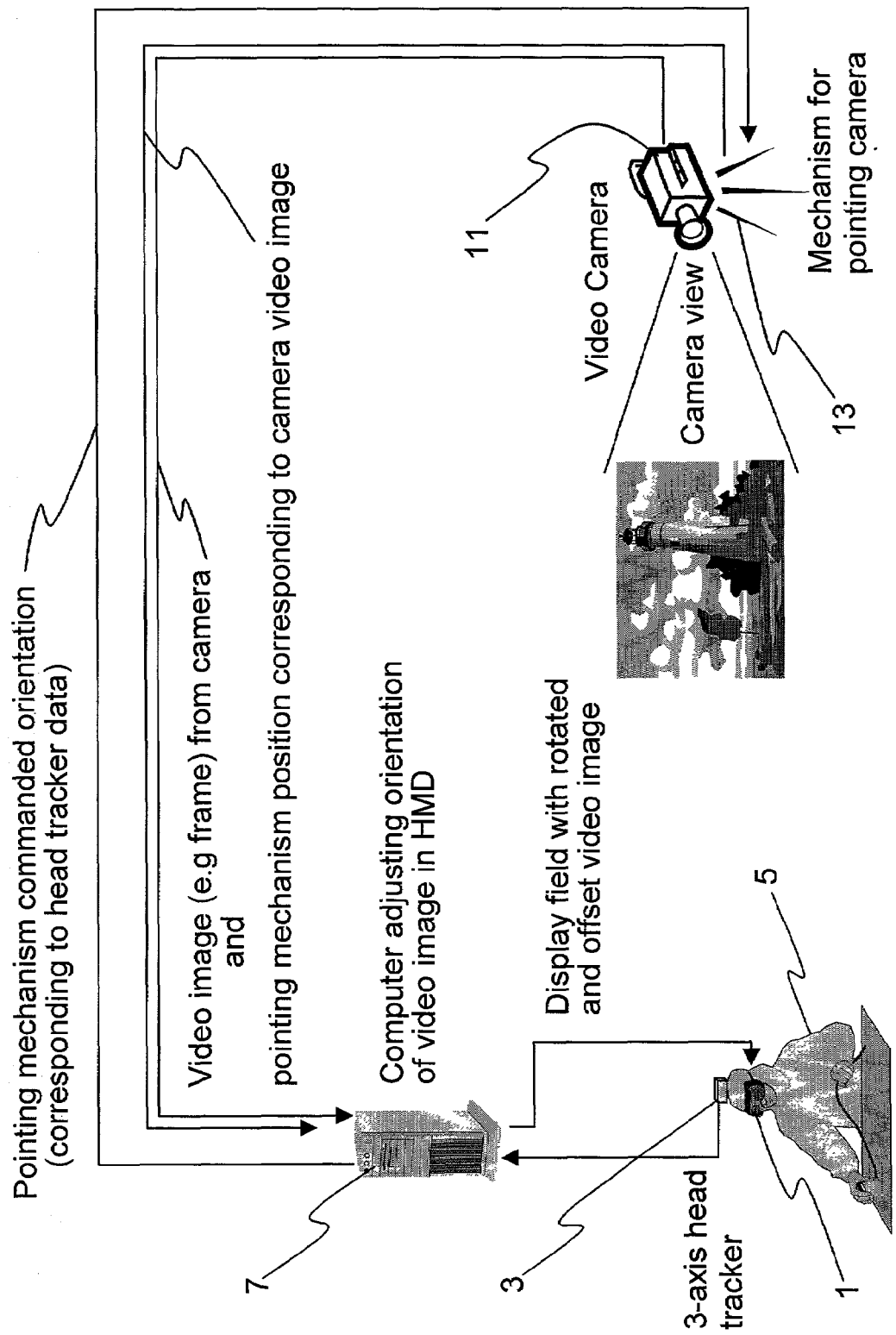
FIG. 1 is a simplified block diagram of a system incorporating an HMD coupled to a first computer and in communication with a remote camera.
Figure 2:
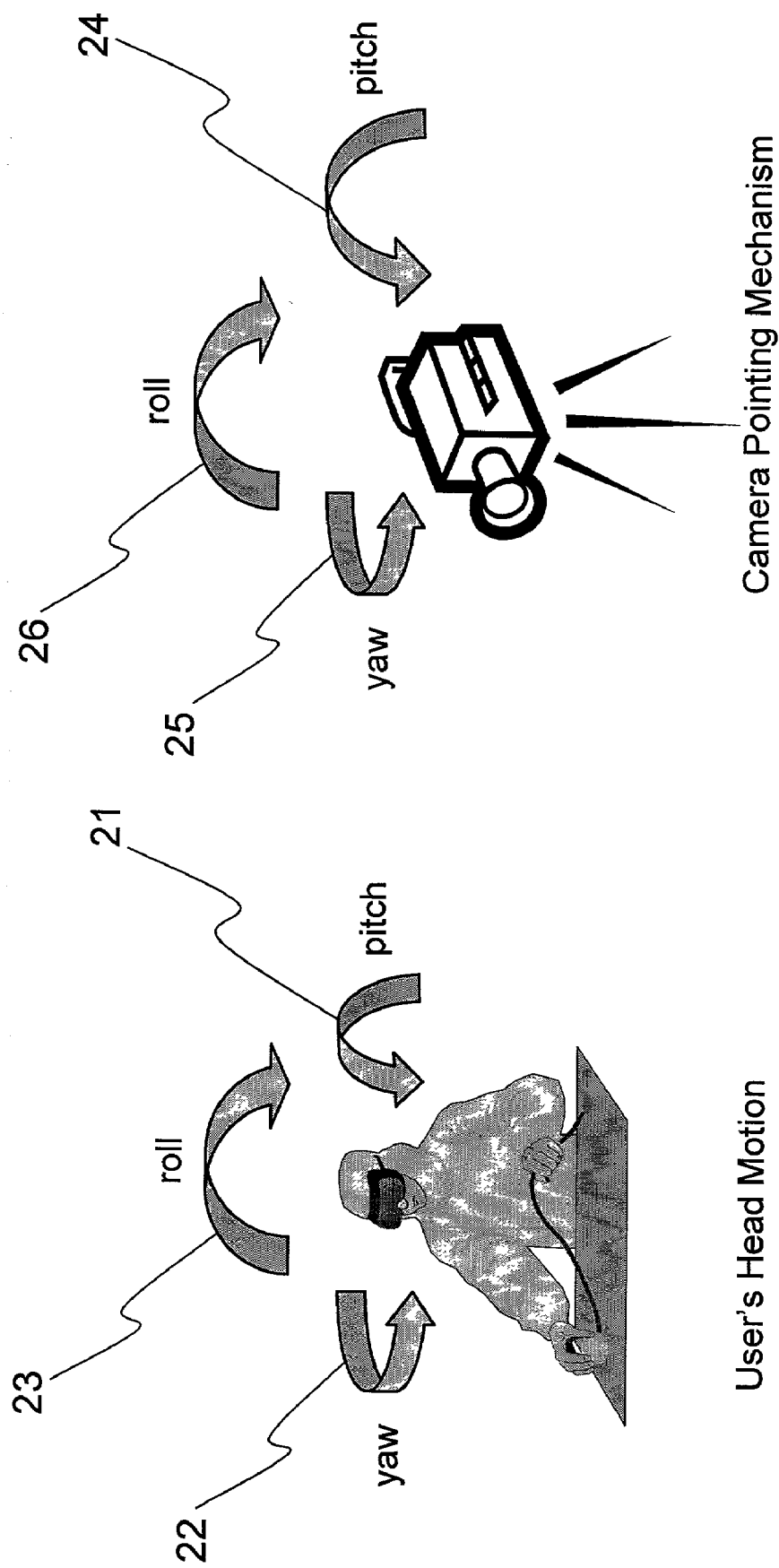
FIG. 2 is a simplified diagram showing axes of movement of the systems involved.

Referring to FIG. 1, a simplified block diagram of a telepresence system is shown. A head mounted display (HMD) 1 including a three-axes head tracker 3 is worn by an operator 5. The HMD 1 is coupled with a first computer 7 and provides to the first computer 7 HMD values for the HMD position in the form of pitch 21, yaw 22, and roll 23 angles of the HMD 1 as shown in FIG. 2. Of course, since the HMD 1 is being worn by an operator 5, these HMD values relate to the head position of the operator 5. These values are provided to the first computer 7 at intervals, preferably more than 100 times each second, though other intervals are also acceptable. The HMD values are converted by the first computer 7 into control values for controlling positioning of a camera 11. The control values are transmitted to a mechanism 13 for pointing the camera in order to affect camera orientation. As is seen in FIG. 2, the mechanism controls pitch 24, yaw 25 and roll 26 of the camera 11. In response to the control values, the camera position moves in accordance with the movement of the HMD 1.

When the mechanism 13 for pointing the camera is physically coupled to the first computer 7, the camera 11 begins to move when HMD motion is detected. The lag between camera motion and HMD motion is determined by communication delays, which are very small, processing delays, which may be minimal, and pointing mechanism performance, which varies. These delays often result in an image provided from the camera 11 remaining static while the HMD 1 is in motion or moving substantially slower than the HMD motion. Of course, since the operator's mind expects motion within the visual frame, this is disconcerting and often results in nausea and disorientation.

This problem is even more notable when communication delay times are significant such as when used for terrestrial control of systems in space. There, the delay is in the order of seconds and, as such, the disorientation of an operator during HMD motion is significant. Significantly, disorientation is a cause of operator fatigue resulting in limited operator use of a system or limited use of a system during a day.

Referring again to FIG. 1, the camera 11 is constantly acquiring images at a video data capture rate. Each image is transmitted to the first computer for processing, if required, and for provision to the HMD 1. According to the invention, the remote system also provides camera position information to the first computer 7 and associated with each image. Thus, each frame received by the first computer 7 has associated therewith camera position information. The camera position information is preferably relative to a known orientation. Alternatively, it is transformed by the first computer 7 into position information relative to a known camera orientation and in a coordinate space analogous to that of the HMD 1.

The HMD position values are used to determine a current HMD orientation in a coordinate space analogous to that of the camera 11. As such, an offset between camera orientation and HMD orientation is determinable. Since the HMD 1 is being worn by an operator 5 the HMD orientation is directly correlated to the position of the head of the operator 5. Of course, the direct correlation is related to sensed position data and in use is generally an approximate direct correlation due to a refresh rate of the HMD position sensor. The offset between the camera orientation and the HMD orientation is related to a delay between the local system and the remote system.

Figure 3A:
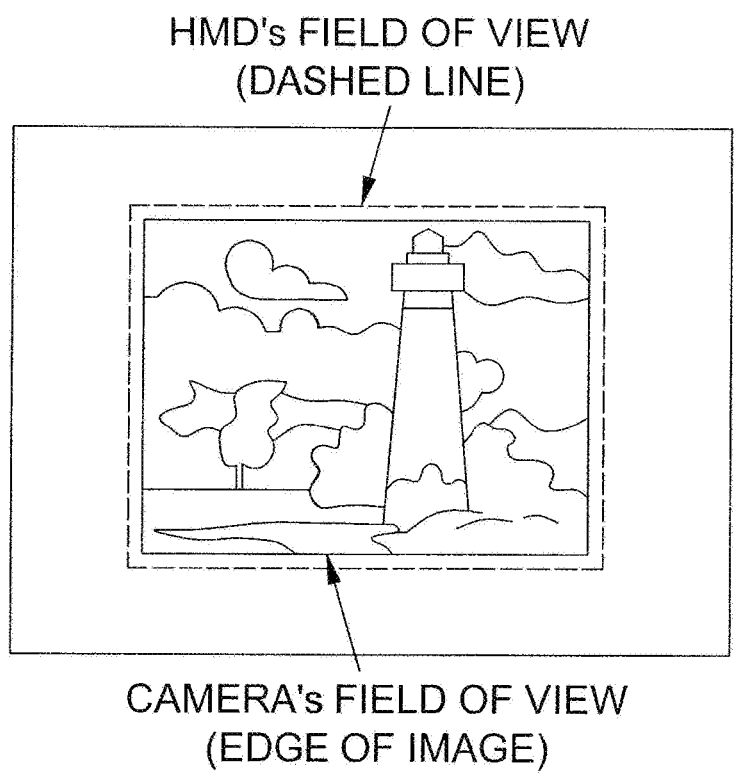
FIG. 3a is a simplified diagram showing a simulated view of an image appearing within the field of view of an HMD.
Figure 3B:
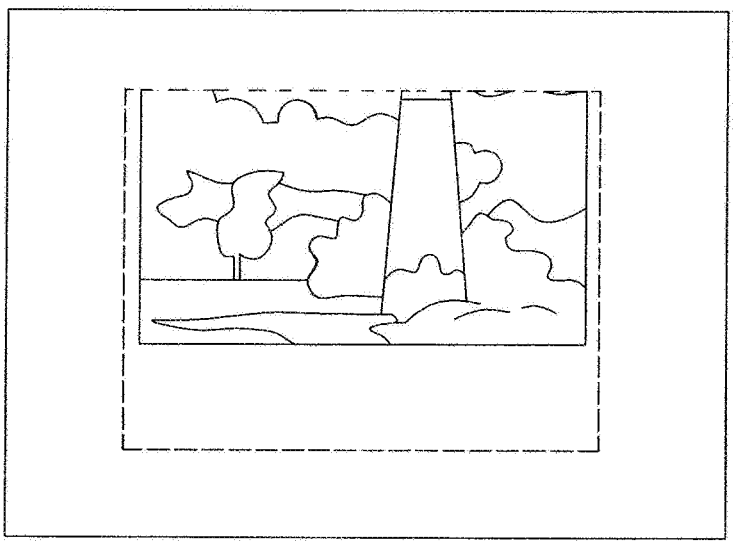
FIG. 3b is a simplified diagram showing a simulated view of a portion of the image of FIG. 3a offset vertically within the field of view of an HMD in response to a downward motion of a user's head.
Figure 3C:
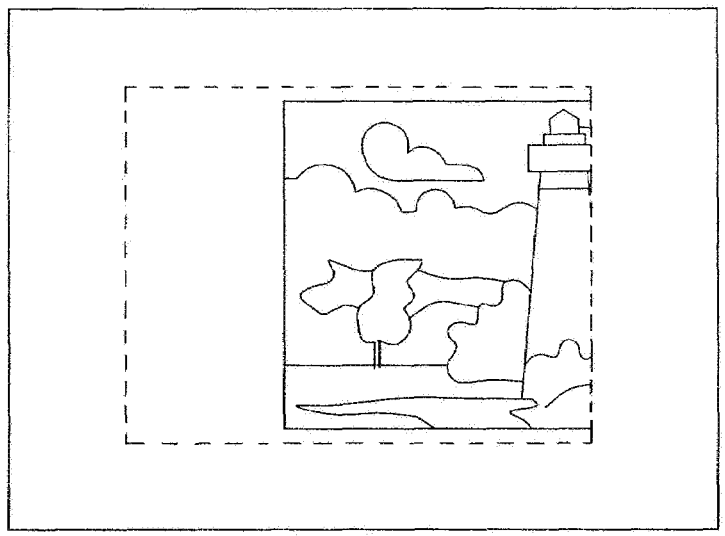
FIG. 3c is a simplified diagram showing a simulated view of a portion of the image of FIG. 3a offset horizontally within the field of view of an HMD in response to a lateral motion of a user's head.
Figure 3D:
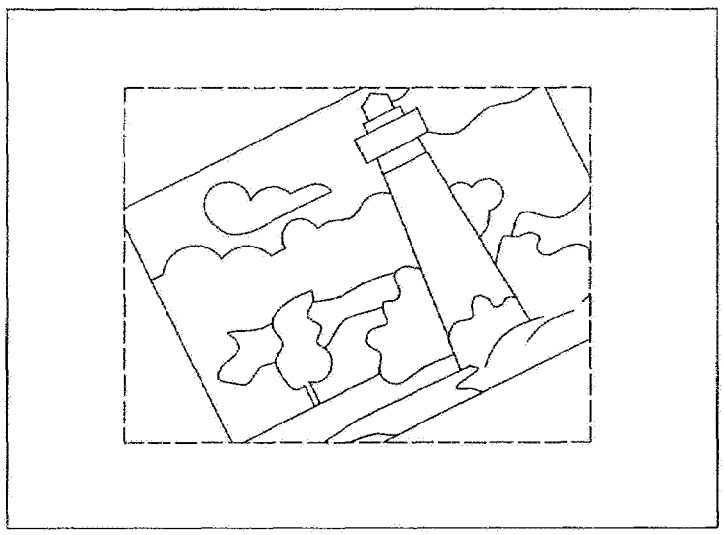
FIG. 3d is a simplified diagram showing a simulated view of a portion of the image of FIG. 3a tilted within the field of view of an HMD in response to a tilting motion of a user's head.
Figure 3E:
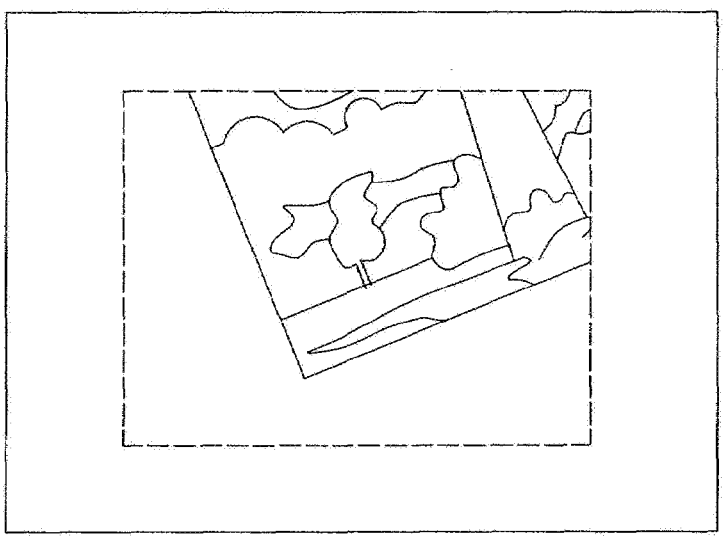
FIG. 3e is a simplified diagram showing a simulated view of a portion of the image of FIG. 3a tilted and offset both vertically and horizontally within the field of view of an HMD in response to a tilting motion combined with a lateral and a horizontal motion of a user's head.

Therefore when a non-zero offset is determined, the first computer offsets the image provided by the camera relative to the field of view of the HMD in order to compensate for the determined offset. Referring to FIGS. 3*a*, 3*b*, 3*c*, 3*d* and 3*e*, some examples of image displays are shown. In FIG. 3*a*, the image is shown for a zero offset between camera orientation and HMD orientation. This is the steady state of the feedback system since the HMD 1 is directed in a same direction as the camera 11 and the image displayed on the display within the HMD 1 is the same as the image captured by the camera. When the HMD orientation is angled down from the camera position, the image is offset in a vertical direction as shown in FIG. 3*b*. When the camera orientation is offset horizontally, the image is offset horizontally as shown in FIG. 3*c*. In FIG. 3*d* and FIG. 3*e*, the image is rotated and offset relative to the field of view because the camera orientation is rotated and offset relative to the HMD orientation.

Though the described instantaneous corrections shown in FIGS. 4*a*, 4*b*, 4*c* and 4*d* appear simple, the steady state nature of the system requires an ever changing imaging perspective and display perspective. Thus a comparison is necessary between two dynamic sets of sensed position data.

Figure 4A:
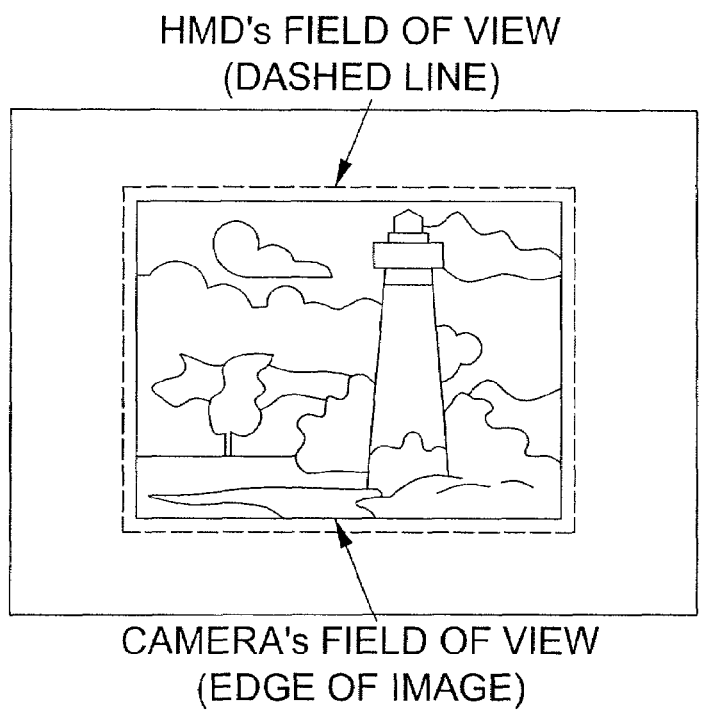
FIG. 4a is a simplified diagram showing a simulated view of an image appearing within the field of view of an HMD.
Figure 4B:
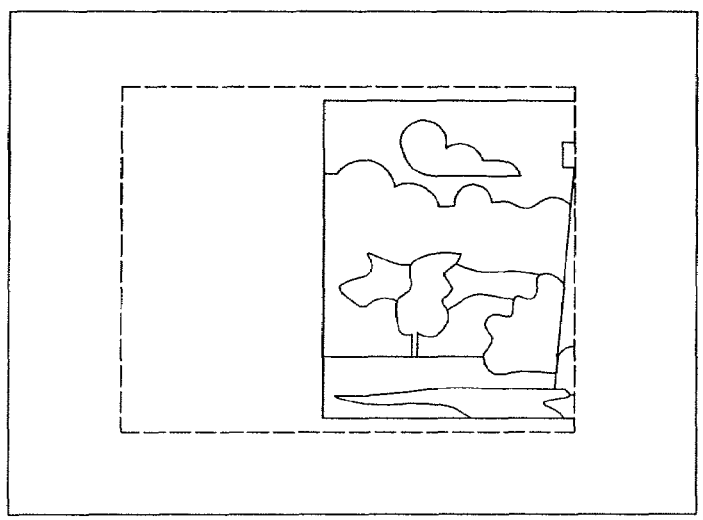
FIG. 4b is a simplified diagram showing a simulated view of a portion of the image of FIG. 4a offset horizontally within the field of view of an HMD in response to a lateral motion of a user's head.
Figure 4C:
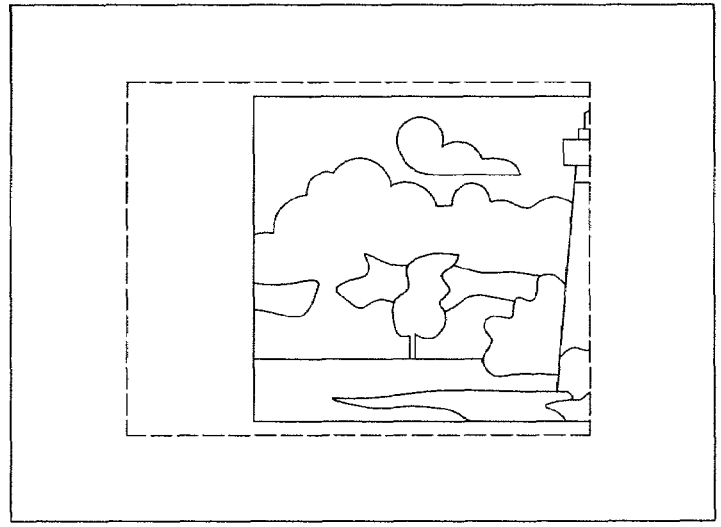
FIG. 4c is a simplified diagram showing a simulated view of an image appearing within the field of view of an HMD including a portion of the image of FIG. 4a as well as additional image data captured and displayed within the field of view of an HMD when the camera motion is partially caught up with the lateral motion of a user's head.
Figure 4D:
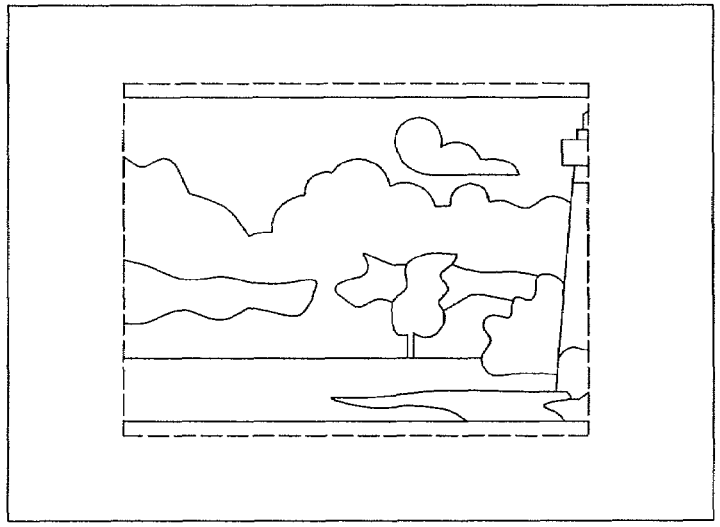
FIG. 4d is a simplified diagram showing a simulated view of an image appearing within the field of view of an HMD including a portion of the image of FIG. 4a as well as additional image data captured and displayed within the field of view of an HMD after the camera motion is fully caught up with the lateral motion of a user's head.

Referring to FIGS. 4*a*, 4*b*, 4*c* and 4*d*, field of view is shown for the HMD 1 during a left turn of the operator's head. At first (before the head turn) in a steady state, the exact image captured by the camera 11 is shown in the display of the HMD 1 at FIG. 4*a*. When the head turns, the operator 5 "expects" the image to move to the right since the image is not part of the operator 5 and is within their field of view. This expectation is either conscious or unconscious. Imagining that the image remains static as the HMD moves, it is clear that disorientation would result since individuals take cues from their visual field of view during head movement. In order to provide the operator 5 with the "expected" displacement of objects in the image, the image is offset to a location approximately the same as the orientation difference between the HMD 1 and the camera 11. For example, in the image of FIG. 4*b* the lighthouse is shifted out of the field of view by the rotation of the head. Turning the HMD α degrees, an operator expects static objects within the field of view, such as a lighthouse, to shift α degrees within the field of view. This is important to maintaining comfort of the operator in their personal vision system (their eyes and their mind). At a same time, the camera begins to move to match its orientation to that of the HMD. Thus, as shown in the image of FIG. 4*c* more of the scene within the operator's field of view is now available from the camera 11. As the camera orientation "catches up" with the HMD orientation, the field of view of the camera and that of the HMD overlap more. When the camera 11 is "caught up," the field of view of the HMD again shows an entire image captured by the camera as shown in the image of FIG. 4*d*.

Figure 5:
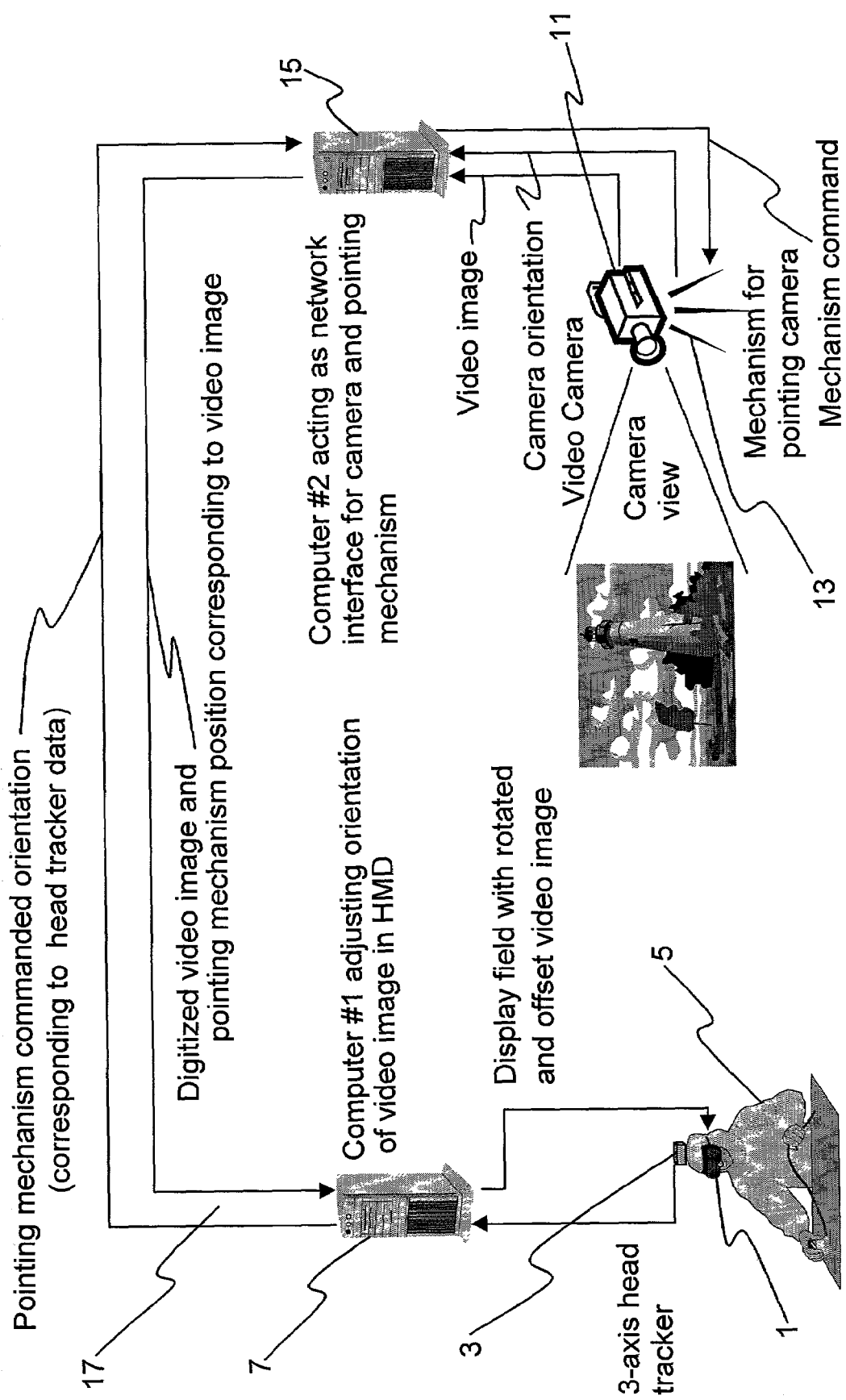
FIG. 5 is a simplified block diagram of a system incorporating an HMD coupled to a first computer and in communication across a network with a second computer coupled to a remote camera.

Referring to FIG. 5, another embodiment of the invention is shown for use on a network. Here for example, two computers 7 and 15 communicate via a network or networks 17. The first computer 7 includes the HMD 1 as a peripheral thereof. The second computer 15 includes the camera 11 and mechanism 13 for pointing the camera as peripherals thereof. Here the processing is performed in either of the first computer 7 or the second computer 15 though the image processing is preferably performed in the first computer 7 in case of network delays that could cause image offset and result in disorientation of an operator 5. Of course, when network delays are known to be significant, it is important that image processing is performed on the first computer.

Figure 6:
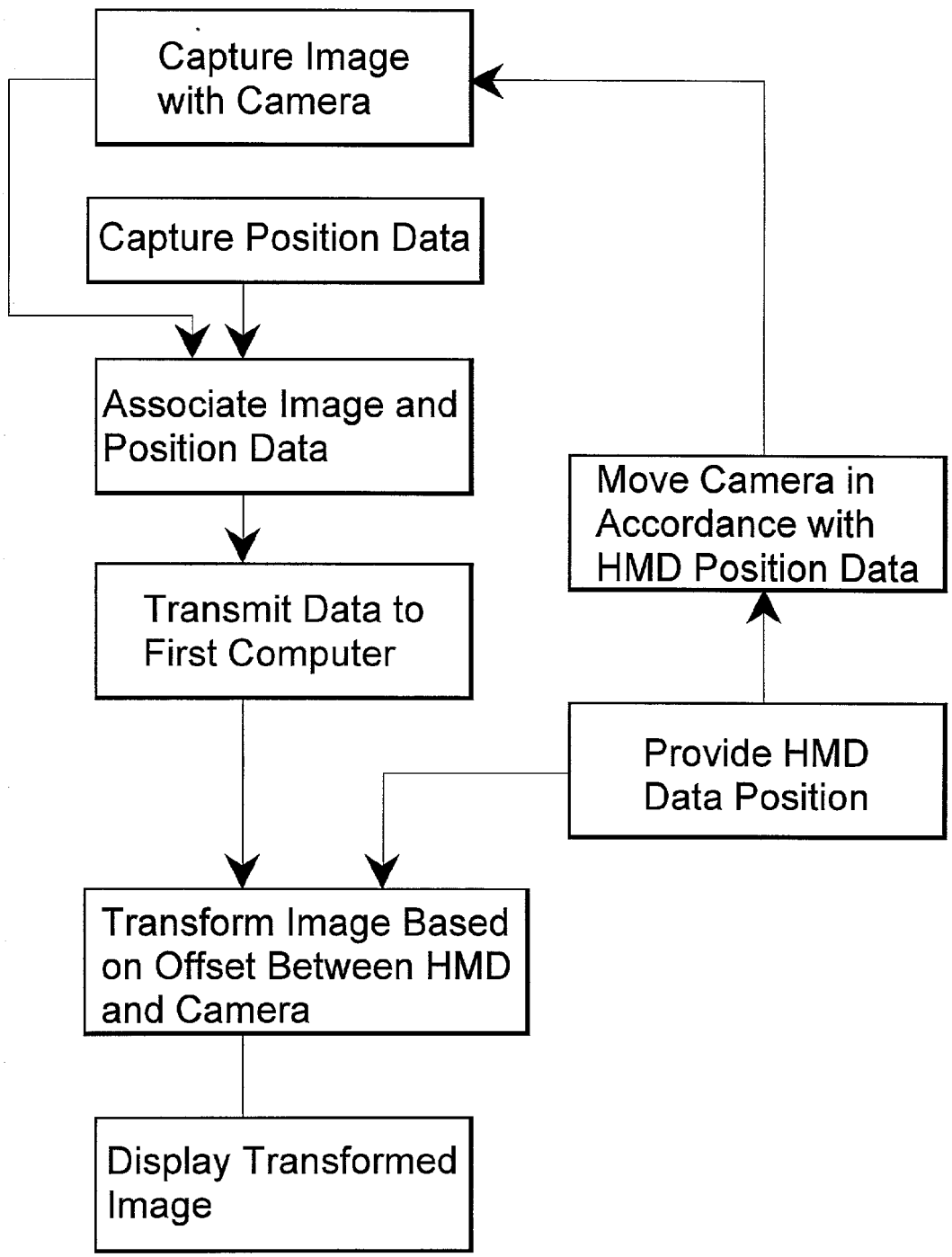
FIG. 6 is a simplified flow diagram of a method according to the invention.

Referring to FIG. 6, a simplified flow diagram of a method of performing the invention is shown. An image is captured by the camera 11. A sensor captures position data in the form of camera orientation values for pitch, roll and yaw. The position data is preferably captured concurrently with the image. Alternatively, it is captured approximately at a same time but offset by a finite amount either immediately after image capture or immediately before. The position data is then associated with the image data. A simple method of associating the data is by encoding the position data with the image data either as header or trailer information. Of course, the image and the position data could also be identified with an associating identifier such as an image frame number. Alternatively, the two data are transmitted in parallel in a synchronous environment.

The image and position data are then transmitted to the first computer 7. When the image and position data are received, they are prepared for processing at the first computer 7. Then, the position data of the HMD 1 is acquired by the first computer 7 and is used to transform the image in accordance with the invention. The transformed image is provided to the display and is displayed thereon to the operator 5. Because the HMD position data is gathered immediately before it is needed, the delay between HMD position data capture and display of the transformed image is very small and results in little or no operator disorientation.

Concurrently, position data is provided to the mechanism 13 at intervals and the mechanism moves the camera 11 in accordance with received position data and a current orientation of the camera 11.

Typically, the step of transforming the image comprises the following steps, some of which are performed in advance. A correlation between angular movement and display or image pixels is determined such that an offset of α degrees results in displacement of the image by N pixels in a first direction and by M pixels in a second other direction. A transform for rotating the image based on rotations is also determined. Preferably, the transforms are sufficiently simple to provide fast image processing. That said, a small image processing delay, because it forms substantially the delay in displaying the data, is acceptable.

Once the image data is received, it is stored in memory for fast processing thereof. The HMD position data is acquired and is compared to the camera position data. The difference is used in performing the transform to correct the image position for any HMD motion unaccounted for by the mechanism 13, as of yet. Also, the method corrects for unintentional movements of the camera 11 when the camera position sensor is independent of the mechanism 13, for example with an inertial position sensor.

In the above embodiment, a general purpose processor is used to transform the image. In an alternative embodiment, a hardware implementation of the transform is used. A hardware implementation is less easily modified, but has a tremendous impact on performance. Using parallel hardware transformation processors, an image can be transformed in a small fraction of the time necessary for performing a software transformation of the image.

Figure 7:
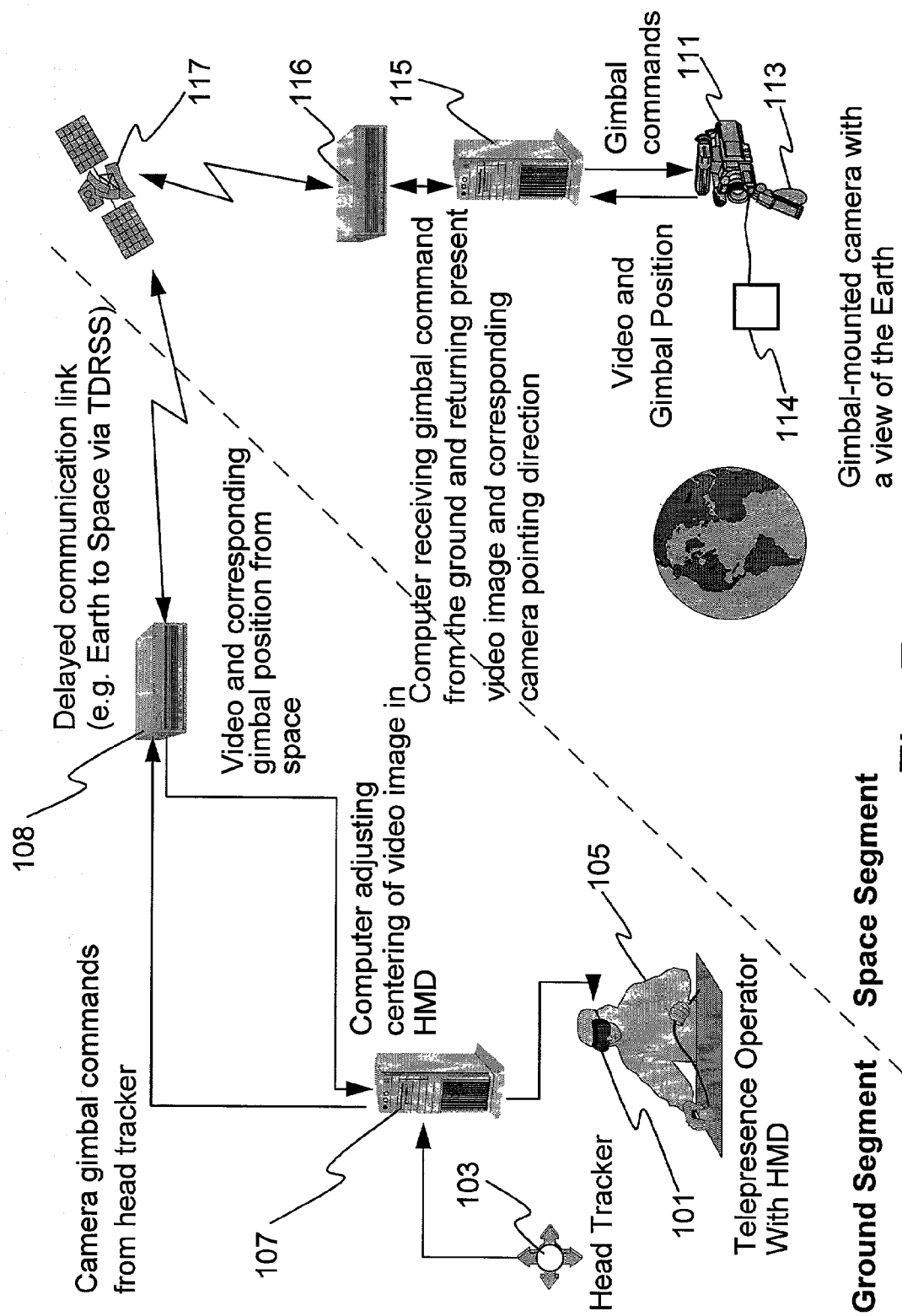
FIG. 7 is a simplified block diagram of a telepresence system communicating via a satellite communications link.

Referring to FIG. 7 a satellite based telepresence system is shown. Here delays in the order of seconds between head motion and image display result. Further, the delays are not always predictable. Here an HMD 101 is shown positioned on the head of an operator 105. The HMD is provided with a head tracker 103 for sensing position data relative to the HMD. The HMD is also coupled with a computer 107 for providing display data to the HMD and for providing the HMD position data to a communications link 108. The communications link 108 uplinks the HMD position data to a satellite 117 from which it is transmitted to a transceiver 116. A computer 115 in communication with the transceiver provides the data to a gimbal 113 for repositioning a camera 111 in accordance therewith. The camera 111 captures images which are provided along a reverse communication path—computer 115, transceiver 116, satellite 117, communications link 108—to the computer 107. Optionally, a different return path is used. There the image data is processed for display within the HMD 101. With the images, camera position data sensed by a sensor 114 is also provided. The camera position data is associated with an image or images captured at approximately a time the camera 111 was in that sensed position.

The computer 107 uses the camera position data and the image along with data received from the head tracker 103 to transform the image in accordance with the invention. As is evident, the delay between HMD motion and camera motion is measurable in seconds. The delay between camera image capture and receipt of the image at the computer 107 is also measurable in seconds. As such, significant disorientation of the user results absent application of the present invention.

Figure 8:
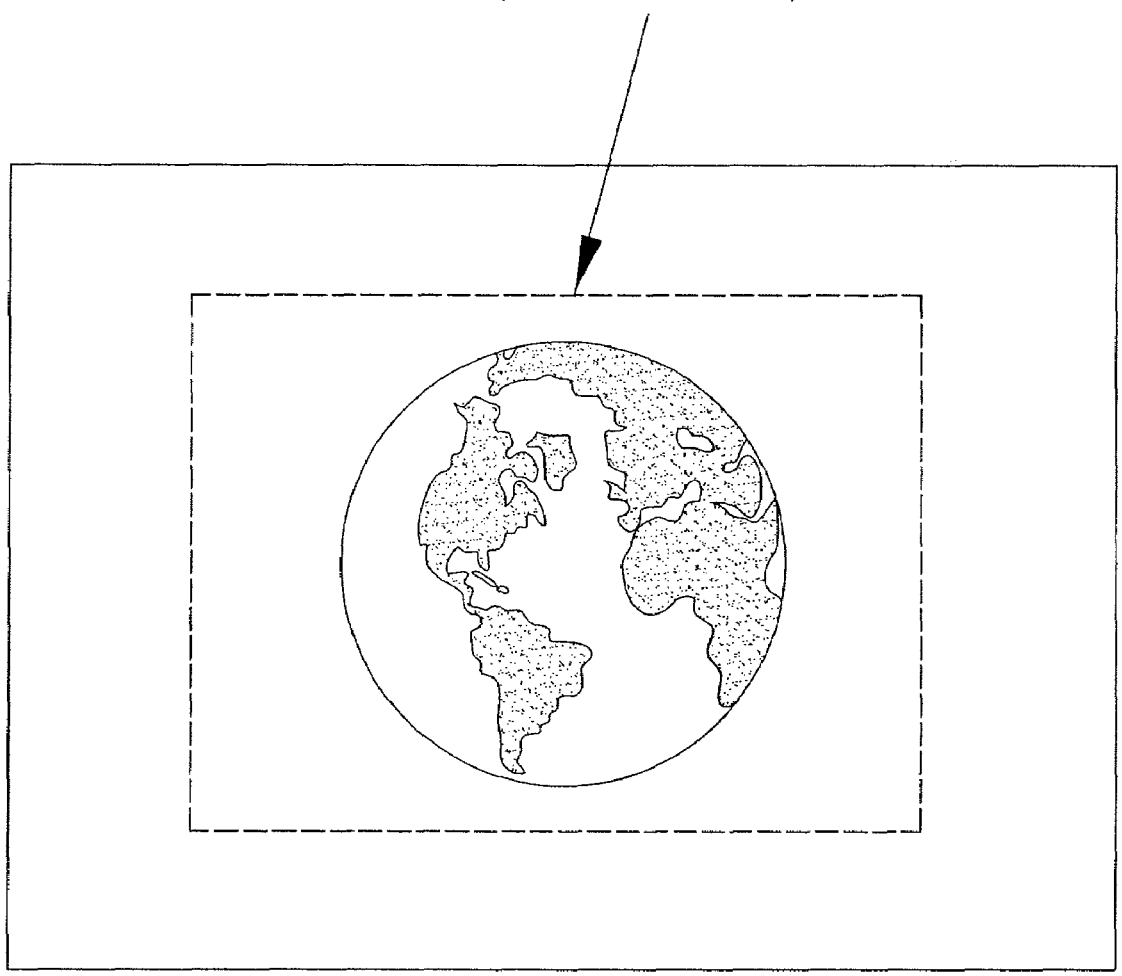
FIG. 8 is an image captured by a remote camera as captured.
Figure 9:
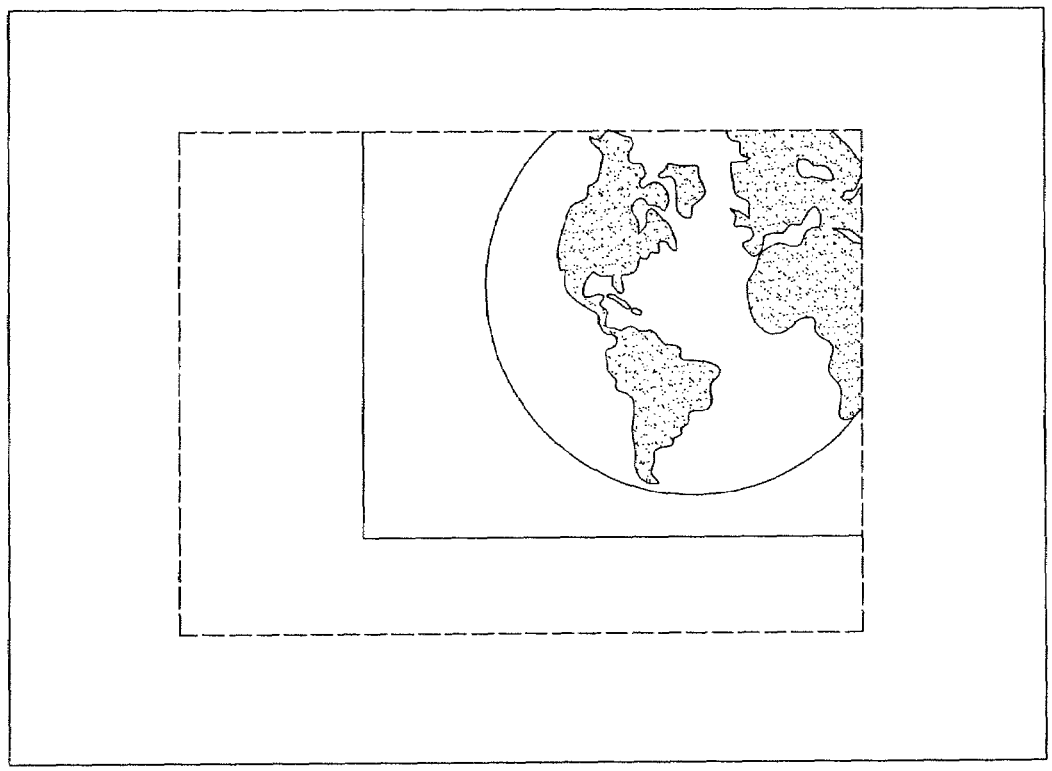
FIG. 9 is an image of the same image as that of FIG. 8 transformed within an endless image display space; and, FIG. 10 is an image of the same image as that of FIG. 9 as displayed on a display having a finite image display space.
Figure 10:
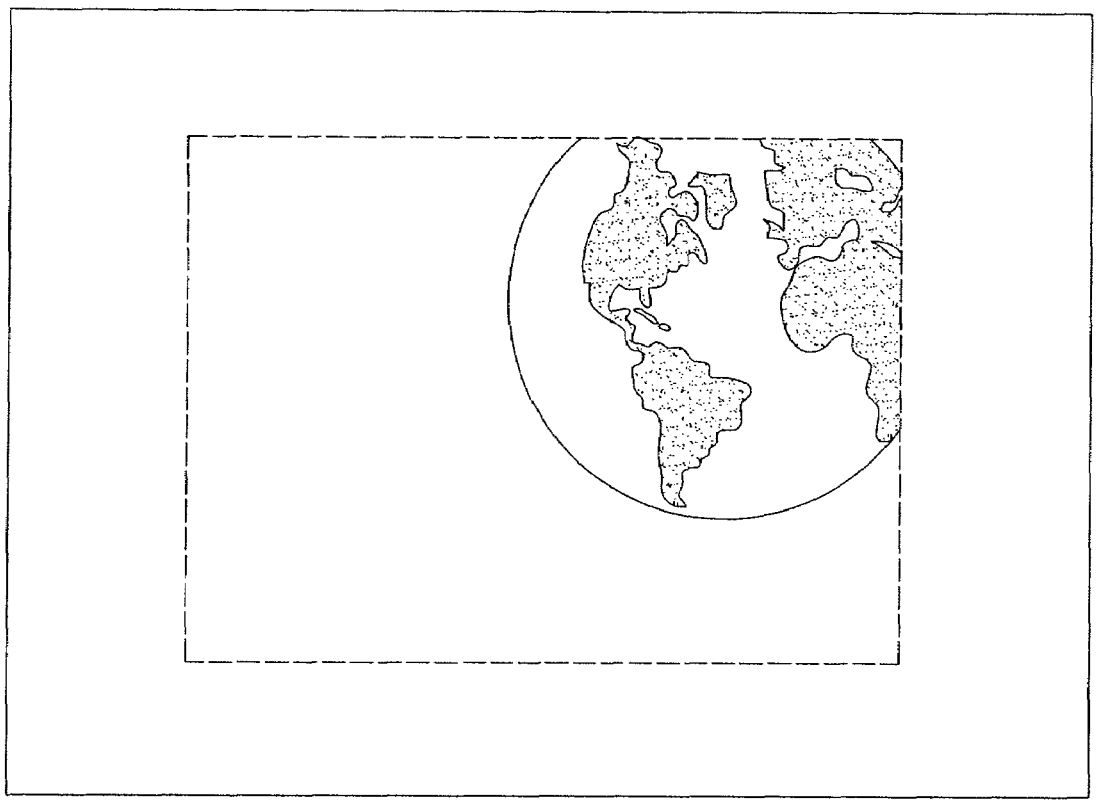

Referring to FIG. 8, an image captured by the camera 111 is shown. The image is displayed as captured when the HMD and the camera orientations are aligned, the camera orientation at a time of image capture and the HMD orientation at a time of display. If the orientations are offset one from another, the image is shifted within the field of view of the operator as shown in FIG. 9. Since there is no image data beyond the camera imaging field of view, the remainder of the display area is shaded with a neutral colour such as gray. Alternatively, the remainder of the display area is shaded to provide reference points to further limit disorientation of the operator 105. Further alternatively, the portion of the field of view for which no image data is available is left blank. Typically blank areas are black in order not to distract an operator. Referring to FIG. 10, when the camera 111 orientation is "caught up" with the HMD orientation, the field of view of the HMD again shows an entire image captured by the camera.

Alternatively, the camera captures images of areas larger than can be displayed and only a portion of the image is displayed. This is considered less preferable since it increases the bandwidth requirements and often for no reason as the additional data is not displayed.

Advantageously, when implemented with independent position indicators for each of the HMD 1 and the camera 11 and independent from the mechanism 13 for moving the camera, all types of motion are compensated for including inaccuracies of the mechanism 13, delays induced by communications, delays induced by the mechanism 13, processing delays, fine operator motions and so forth.

When processing is done local to the HMD or on a computer at a same location with minimal delays therebetween, each image is accurately aligned on the display within a time delay error related only to the processing and the delay in reading HMD sensor data.

Thus, discontinuous scene changes are changed into smooth transitions in accordance with the expected visual result.

It is also within the scope of the invention to process the image data prior to display thereof in order to determine features or locations within the image data to highlight or indicate within the displayed image. For example, contrast may be improved for generally light or dark images. Also, features may be identified and labeled or highlighted. Alternatively, icons or other images are superimposed on the displayed image without processing thereof.

Alternatively, the control values are determined in the mechanism for pointing the camera instead of by the first computer. In such an embodiment, the HMD position data is transmitted to the remote system wherein a camera movement related to the HMD movement is determined and initiated.

The above described embodiment compensates for orientation—motion about any of three rotational axes. Alternatively, the invention compensates for displacement—linear motion along an axis. Further alternatively, the invention compensates for both linear motion and motion about any of the rotational axes. Displacement and orientation are both forms of position and data relating to one or both is referred to here and in the claims, which follow, as position data.

The above described embodiment does not correct images for perspective distortion. Doing so is feasible within the concept of time/motion compensation according to the invention, however it is not generally applicable to use with a single camera, since the depth of field of the observed scene varies. It would require capturing of depth data using a range sensor or a three-dimensional vision system.

Though the above embodiment is described with reference to a physical communication link or a wireless communication link between different components, clearly, either is useful with the invention so long as it is practicable. Also, though the HMD is described as a computer peripheral, it could be provided with an internal processor and act as a stand alone device.

According to another embodiment of the invention, areas within the field of view that do not correspond to displayed image locations are filled with current image data relating to earlier captured images for those locations. Preferably, any earlier captured images are deemphasized within the field of view in order to prevent the operator from being confused by "stale" image data. For example, each image received from the camera is buffered with its associated position data. When some areas within the field of view are not occupied by image data, the processor determines another image having image data for those locations within the field of view, the locations determined in accordance with the transform performed based on the camera position data associated with the earlier captured image and with the current HMD position data. The image data is then displayed at the determined location(s) in a "transparent" fashion. For example, it may be displayed with a lower contrast appearing almost ghostlike. Alternatively, the colours are faded to provide this more ghostlike appearance. Further alternatively, it is displayed identically to the current image data.

The above description is by way of example and is not intended to limit the forgoing claims.

The invention claimed is:

1. A method of motion compensation for a head mounted display (HMD) wherein a camera tracks movement, subject to possible delay, of an operator's head to capture images within a field of view controlled by the orientation of the operator's head, comprising the steps of:
    sending a sequence of captured images at a video capture rate from the camera to a processor associated with the head mounted display;
    obtaining camera position data identifying the field of view of the camera for each captured image;
    associating said camera position data with the corresponding captured images;
    providing HMD position data corresponding to a current position of the head mounted display;
    for each captured image received by the computer comparing the HMD position data with the camera position data associated with the captured image to determine whether an offset exists between a first field of view associated with the captured image and a second field of view corresponding to the current position of the head mounted display;
    in the absence of a said offset displaying the captured image or a portion thereof in the head mounted display; and
    in the presence of a said offset, transforming the captured image to create a transformed image comprising a portion of said captured image that overlaps said first and second fields of view and displaying said transformed image in the head mounted display in a part of said second field of view, the position of said part of said second field of view in the head mounted display corresponding to the position of the overlapping portion of the captured image in the second field of view.

2. A method according to claim 1, wherein a remaining part of said second field of view not displaying said transformed image is filled with a predetermined fill.

3. A method according to claim 2, wherein the predetermined fill has features to assist the operator in maintaining personal orientation.

4. A method according to claim 1, wherein the captured image is larger than the field of view of the head mounted display, and only a portion of the captured image is displayed therein.

5. A method according to claim 1, wherein a first independent position sensor senses the camera position and provides the camera position data.

6. A method according to claim 5, wherein a second independent position sensor senses the head mounted display position and provides the HMD position data.

7. A method according to claim 1, wherein an independent position sensor senses the head mounted display position and provides the HMD position data.

8. A motion compensation apparatus according to claim 6, further comprising:
    a mechanism for moving the camera; and
    a communications link for transmitting the HMD position data to a system in controlling the mechanism for moving the camera.

9. A method according to claim 1, wherein the HMD position data comprises orientation data.

10. A method according to claim 9, wherein the camera position data comprises orientation data.

11. A method according to claim 10, wherein the camera position data comprises displacement data.

12. A method according to claim 1, wherein the HMD position data comprises displacement data.

13. A method according to claim 12, wherein the camera position data comprises displacement data.

14. A method according to claim 13, wherein the camera position data comprises orientation data.

15. A method according to claim 1, wherein the camera includes a range sensor to capture depth data, and the captured images are transformed using said depth data to reduce perspective distortion.

16. A motion compensation apparatus for a head mounted display (HMD) wherein camera tracks movement subject to possible delay, of an operator's head to capture images within a field of view controlled by the orientation of the operator's head, comprising:

said head mounted display including a monitor having a field of view for displaying captured images;

a first processor associated with the head mounted display for receiving captured images for display in said head mounted display;

said camera for sending a sequence of captured images at a video capture rate to said first processor;

a first sensor for providing camera position data relating to a position of the camera for each captured image;

a second processor for associating the camera position data with the corresponding images sent to the first processor;

a second sensor for providing HMD position data relating to a position of the head mounted display; and said first processor, for each captured image received thereby, comparing the HMD position data with the camera position data associated with the captured image to determine whether an offset exists between a first field of view associated with the captured image and a second field of view corresponding to the current position of the head mounted display; and in the absence of a said offset said first processor displaying the captured image or a portion thereof in the head mounted display; and in the presence of a said offset, said first processor transforming the captured image to create a transformed image comprising a portion of said captured image that overlaps said first and second fields of view and displaying said transformed image in the head mounted display in a part of said second field of view, the position of said part of said second field of view in the head mounted display corresponding to the position of the overlapping portion of the captured image in the second field of view.

17. A motion compensation apparatus according to claim 16, wherein the camera includes a range sensor.

18. A motion compensation apparatus according to claim 16, wherein the camera forms part of a three-dimensional vision system.

19. A method according to claim 1 wherein, when parts of the second field of view for which image data is unavailable are detected, earlier captured image data is located, which when transformed in dependence upon its associated camera position data and the HMD position data is for display within said parts; and, the transformed earlier captured image data is displayed in those parts of the field of view.

20. A method according to claim 19, wherein the transformed earlier captured image data is de-empasized relative to current captured image data.

* * * * *